Aug. 5, 1952  W. W. SMITH  2,605,733
SECTIONAL BARGE
Filed Sept. 23, 1949  2 SHEETS—SHEET 1
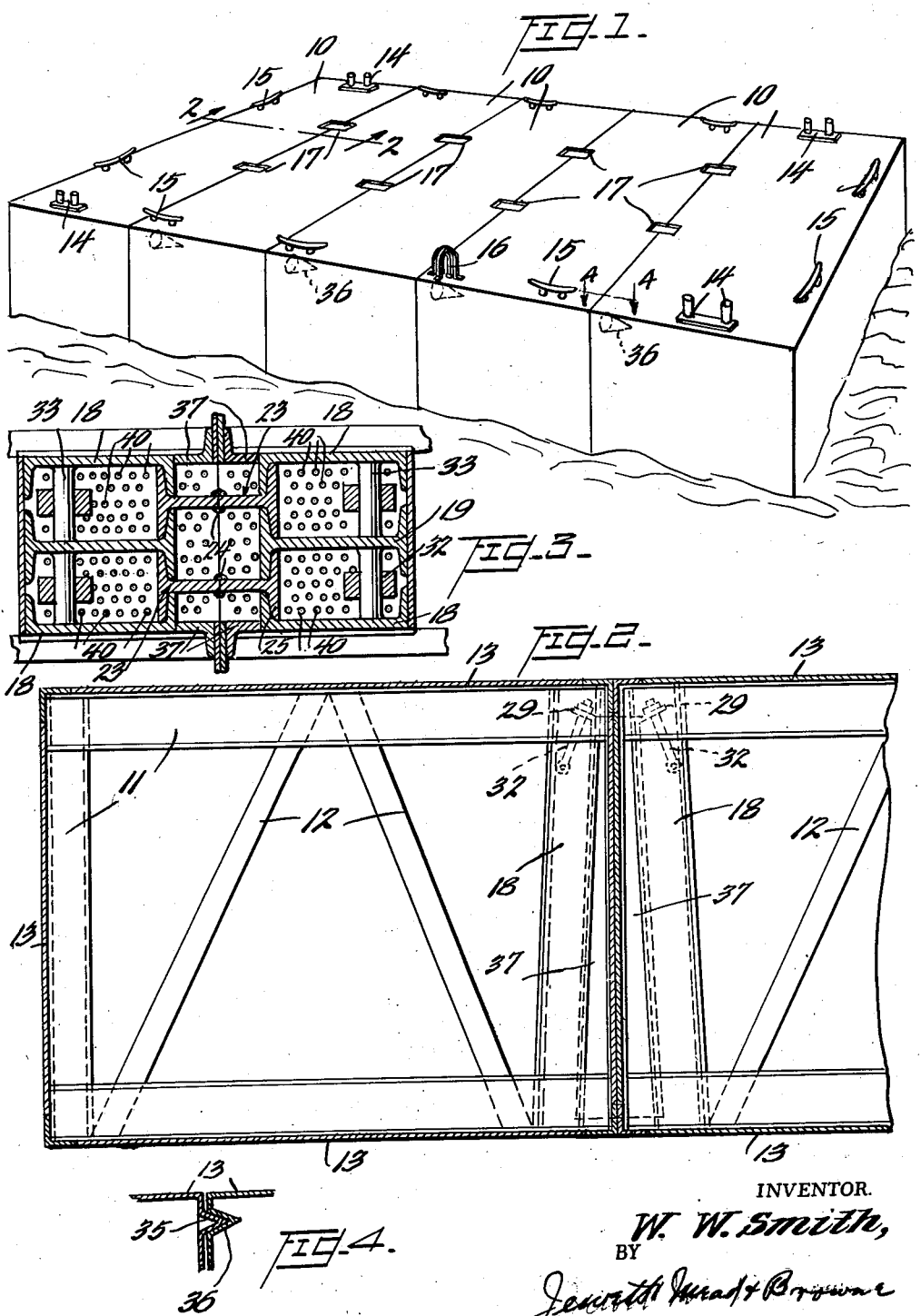
INVENTOR.
W. W. Smith,
BY
ATTORNEYS Aug. 5, 1952     W. W. SMITH     2,605,733
SECTIONAL BARGE
Filed Sept. 23, 1949     2 SHEETS—SHEET 2
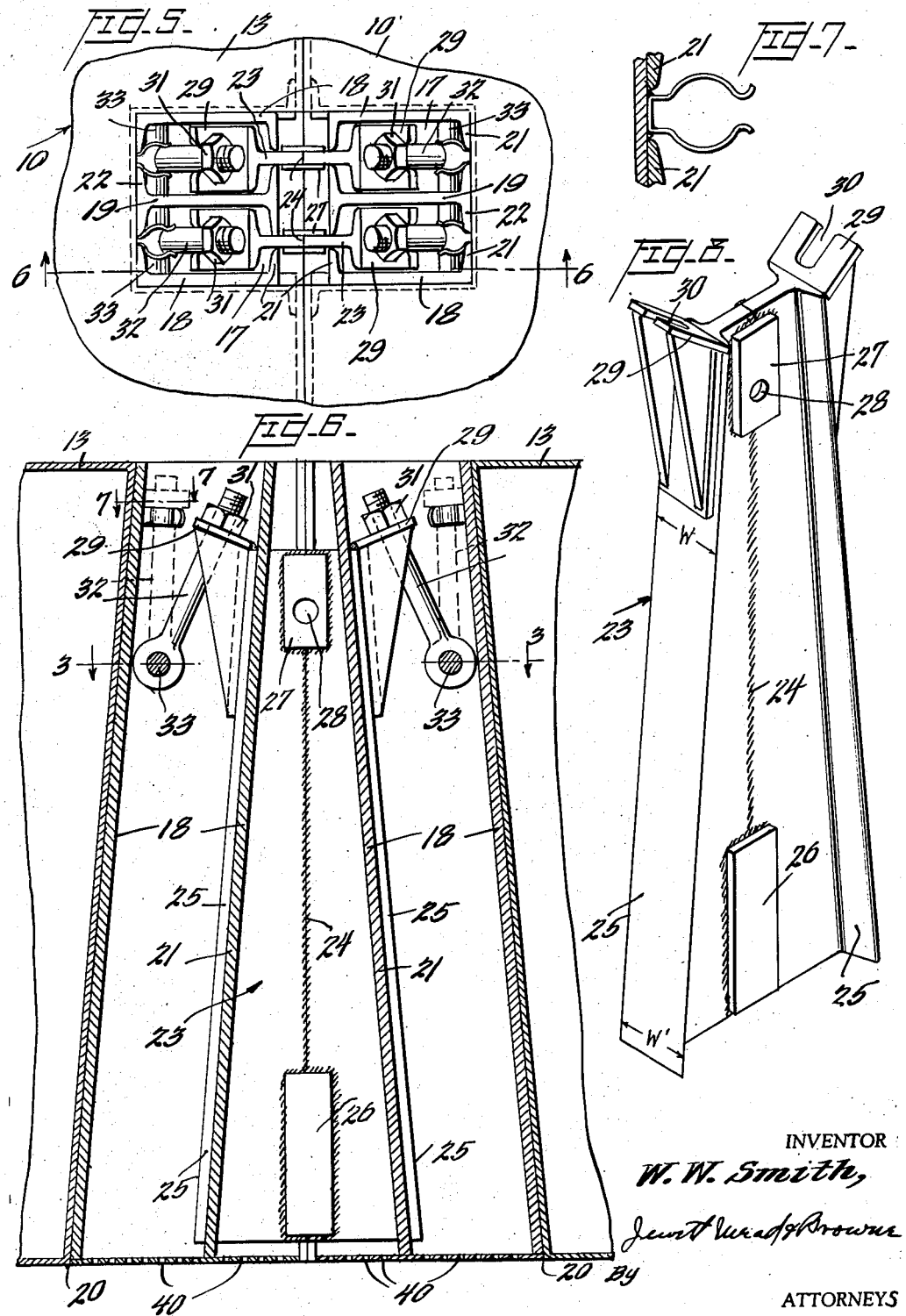
INVENTOR
W. W. Smith,
ATTORNEYS Patented Aug. 5, 1952

2,605,733

UNITED STATES PATENT OFFICE 2,605,733

SECTIONAL BARGE

Wallace W. Smith, Eustis, Fla.

Application September 23, 1949, Serial No. 117,301

7 Claims. (Cl. 114—0.5)

The invention relates to sectional barges and clamp means, the latter adapted for use in holding the sections of the barge in assembly and for other uses.

It is an object of the invention to provide a sectional barge comprising a plurality of individual tanks so clamped together as to form, in effect, a single rigid whole.

It is a further object of the invention to provide a sectional barge comprising a plurality of tanks formed with recesses in their meeting walls with wedge clamp means housed in the recesses to clamp the meeting walls of the tank into rigid contact.

It is a further object to provide a sectional barge, as above, with dowel means to resist relative motion between the meeting walls and further serving to guide the parts to registration during assembly.

It is a further object to provide a clamp means utilizing a wedge, the clamp housed in facing recesses in the structures to be clamped together, and operable to draw together any two structures to which the clamp may be applied. While the clamp, as illustrated in use in a sectional barge, is placed in a vertical position, it is obvious that it may be placed horizontally in horizontal recesses.

Further objects will appear from the following description when read with the accompanying drawings showing an illustrative embodiment of the invention and wherein:

Fig. 1 is a perspective view of a sectional barge;

Fig. 2 is a detail vertical section on line 2—2 of Figure 1;

Figure 3 is a detail horizontal section on line 3—3, Figure 6;

Fig. 4 is a detail vertical section on line 4—4, Figure 1;

Fig. 5 is a detail plan view of two meeting recesses with the clamp in place;

Fig. 6 is a detail vertical section on line 6—6, Figure 5;

Fig. 7 is a detail horizontal section showing a draw-bolt clip on line 7—7, Figure 6; and Fig. 8 is a perspective view of a wedge clamping member.

As shown, the sectional barge of the invention is made up of a plurality of tanks 10, each formed with structural steel framing members 11 and braces 12, to which outside plates 13 are shown as secured. The tanks referred to are shown as formed with bitts 14 and cleats 15 where desired for use in navigation. At 16 there is diagrammatically shown a ventilator for the interior of one of the tanks, any desired number of which may be supplied.

To secure the tanks together, clamping means are housed in meeting recesses 17, two of which are shown as provided in each meeting wall of the tanks. To provide wedge surfaces in the recesses there are shown channel irons 18 and I-beams 19 welded into each of the said recesses.

As clearly shown in Figure 6, the inner wall of the recesses slope downwardly and away from the opposite walls of the meeting recesses as indicated at 20, thus causing the channels 18 and the flanges 22 of the I-beams to occupy the downwardly flaring position shown in Figure 6.

To provide a wedge clamping member for coaction with the said flaring flanges, the element 23 shown at Figure 8 is provided. As shown, this element may be formed of T structural shapes with the web narrower at the top than at the bottom and with the edges welded together as at 24, thus causing the flanges 25 of the element 23 to flare downwardly and outwardly. The flanges 25 are approximately the same width at top and bottom as indicated at W, W', Fig. 8. Reinforcement plates 26, 27 are shown as secured over the welded line 24 to prevent separation under the very large stresses to which the element may be subjected and an opening 28 is shown through which a clevis pin may be inserted when it is desired to pull the element 23 out of use.

To force the element 23 downwardly with the flanges 25 overlapping the flanges 21, 22, a bracket 29 is shown as secured to the outside of each of the flanges 25, the said brackets formed each with a slot 30 to be engaged by a nut 31 carried by an eye-bolt 32 pivoted upon a rod 33 secured in each recess 17. To hold the eye-bolts out of the way while introducing or removing the wedge 23, there is shown a clip welded to the back of the recess 17 for each eye-bolt. With the units 10 placed with their walls in substantial contact, the wedges 23 may be introduced into the recesses and lowered to position, whereupon the eye-bolts 32 are swung to the position shown in Figure 6 and the nuts are tightened down, thus exerting force of a very large order upon the flanges of the channels 18 and I-beams 19.

It will be seen that two of the wedge members 23 are illustrated in use in each of the pair of meeting recesses 17. This is desirable for use in sectional barges where the forces in a seaway tending to separate the tanks are very great. Under less severe conditions but one wedge member may be desirable, in which case the recess 17 will be of less width and in effect the I-beam 19 may be omitted and one of the channels 18 moved over to its position. To resist motion of the meeting walls of the sections of the barge, the wall of each thereof adjacent to the top and bottom surfaces are provided with dowels in the form of a conical shell, or a solid body, 35 formed upon one meeting wall and the complementary recess 36 upon the other wall which dowels will not only resist motion in the plane of the walls but will guide the separate elements 10 into registration when they are drawn together.

As shown, and as at present preferred, the structure carried members are provided with facing channels with their flanges presenting a slot for receipt of the web of the wedge member 23. The reverse of this arrangement is usable, wherein the structure-carried members would be of I-shape and the wedge member would comprise facing channel shapes with opposed flanges presenting the slot.

The wedge member shown may be formed from an I-beam without waste by cutting the web at an angle to the flanges, reversing one-half section, and welding the free edges of the webs together.

In like manner the angle members 37 shown as reinforcing the meeting walls of the recesses 17 may be made without waste by cutting the webs of channel shapes at an angle complemental to the angle at which the members 18 are placed and reversing one section for placement. So constructed, the force of the wedge applied to the channels 18 will be transmitted to the webs of angles 37 to press the facing angles 37 of two barge sections together providing an immensely strong structure.

It is readily apparent that the barge of the invention may be broken up by removal of the wedges and the several tanks 10 may by use of a derrick be placed on cars for rail transportation.

It will be seen that if desired a false bow and stern may be secured to the end sections 10 if it is found that their addition will have sufficient value in lessening the resistance to towing. It will also be seen that the wedge clamp may be utilized in any structure which can conveniently be provided with recesses in meeting walls of portions thereof; and that the clamp as above stated may be placed in a horizontal position instead of vertically as shown.

To permit escape of water from the space 17 when the assembled barge is hauled out, as on a ship railway, the bottoms of the spaces are desirably perforated as indicated at 40. To absorb expansion pressures, wooden pins may be inserted in the holes 40, where the structure is to be used under conditions for forming ice. The pins may be long enough to extend to the full length of the recesses.

Minor changes may be made in the physical embodiment of the invention, within the scope of the appended claims without departing from the spirit of the invention.

I claim:

1. In a sectional barge, in combination: a plurality of adjacent tank structures formed with registering recesses in the meeting walls; wedge clamping means housed in the space formed by said registering recesses, comprising spaced webbed members presenting opposed channels and separated flanges with a slot therebetween secured to each of said tank structures, the flanges of said spaced webbed members secured to one of said tank structures being so placed with respect to the flanges of said spaced webbed members secured to an adjacent tank structure as to be nearer together at one end of said space than at the remaining end, a clamping element of I-beam configuration with the web of said I-beam wider at one end than at the other end, the web of said clamping element receivable in the slots between said separated flanges to bring the clamping element into wedging relation; and traction means for forcibly drawing adjacent tank structures together comprising brackets secured to said clamping element and coacting locking bolts secured to said adjacent tank structures.

2. A barge comprising a plurality of separable barge sections, each of said sections having a substantially flat vertical wall with a recess therein extending from the top of the section down said wall, the vertical walls of adjacent sections being in abutting relation and the recesses therein being located opposite each other, a slotted trackway located in each recess and extending lengthwise thereof, the trackways of opposed recesses diverging downwardly away from each other lengthwise of the recesses, and a wedging member engaging each of said trackways throughout its length and extending through the slots thereof to maintain said barge sections together, said wedging member being insertable into contact with said trackways from the top of the barge sections whereby said wedging member may be driven downward to draw adjacent barge sections toward each other and clamp them together.

3. A barge comprising a plurality of separable barge sections, each of said sections having a substantially flat vertical wall with a recess extending from the top of the section down said wall, the vertical walls of adjacent sections being in abutting relation and the recesses therein being located opposite each other, a slotted trackway located in each recess and extending lengthwise thereof, the trackways of opposed recesses diverging downwardly away from each other lengthwise of the recesses, and an I-beam having flanges engaging each of said trackways throughout the length of said I-beam, the I-beam extending through the slots of the trackways to maintain said barge sections together, said I-beam being insertable into contact with the trackway from the top of the barge section whereby said I-beam may be driven downward to draw adjacent barge sections toward each other and clamp them together.

4. A barge comprising a plurality of separable barge sections, each section having a substantially flat wall, an open end elongated recess located in each of said flat walls, the flat walls of adjacent sections being in abutting relation and the recesses therein being located opposite each other, a pair of spaced apart lengthwise extending flanges located in each recess, said flanges being positioned in edgewise relation and defining a slot extending substantially the length of the recess, the pairs of flanges in opposed recesses diverging away from each other lengthwise from the open ends of the recesses, and an I-beam having its flanges located in said opposed recesses in contact with the flanges thereof and its web extending through the slots defined by the recess flanges, said I-beam flanges diverging from each other lengthwise of I-beam in an amount corresponding to the divergence of said opposed pairs of recess flanges whereby the I-beam may be inserted into open ends of opposed recesses and driven lengthwise thereof to wedge adjacent barge sections together and may be removed through said open ends to uncouple said sections.

5. A barge comprising a plurality of separable barge sections, each of said sections having a substantially flat vertical wall with a recess therein extending from the top of the section down said wall, the vertical walls of adjacent sections being in abutting relation and the recesses therein being located opposite each other, a slotted trackway located in each recess and extending lengthwise thereof, the trackways of opposed recesses diverging downwardly away from each other lengthwise of the recesses, locking bolts pivotally mounted in said recesses near the top of the barge sections, and a wedging member having brackets secured at one end thereof, said wedging member engaging each of said trackways throughout its length and extending through the slots thereof to maintain said barge sections together, said wedging member being insertable into contact with said trackways from the top of the barge sections whereby said wedging member may be driven downward to draw adjacent barge sections toward each other and clamp them together, the locking bolts co-acting with the brackets on the wedging member to draw said adjacent sections together.

6. A barge comprising a plurality of separable barge sections, each of said sections having a substantially flat vertical wall with a recess extending from the top of the section down said wall, the vertical walls of adjacent sections being in abutting relation and the recesses therein being located opposite each other, a slotted trackway located in each recess and extending lengthwise thereof, the trackways of opposed recesses diverging downwardly away from each other lengthwise of the recesses, locking bolts pivotally mounted in said recesses near the top of the barge sections, and an I-beam having flanges engaging each of said trackways throughout the length of said I-beam, brackets secured to the I-beam near one end thereof, the I-beam extending through the slots of the trackways to maintain said barge sections together, said I-beam being insertable into contact with the trackway from the top of the barge section whereby said I-beam may be driven downward to draw adjacent barge sections toward each other and clamp them together, the locking bolts co-acting with the brackets on the wedging member to draw said adjacent sections together.

7. A barge comprising a plurality of separable barge sections, each section having a substantially flat wall, an open end elongated recess located in each of said flat walls, the flat walls of adjacent sections being in abutting relation and the recesses therein being located opposite each other, a pair of spaced apart lengthwise extending flanges located in each recess, said flanges being positioned in edgewise relation and defining a slot extending substantially the length of the recess, the pairs of flanges in opposed recesses diverging away from each other lengthwise from the open ends of the recesses, locking bolts pivotally mounted in said recesses near the top of the barge sections, and an I-beam having its flanges located in said opposed recesses in contact with the flanges thereof and its web extending through the slots defined by the recess flanges, said I-beam flanges diverging from each other lengthwise of I-beam in an amount corresponding to the divergence of said opposed pairs of recess flanges and brackets secured to said I-beam at the end where the I-beam flanges are closest together, whereby the I-beam may be inserted into open ends of opposed recesses and driven lengthwise thereof to wedge adjacent barge sections together, the locking bolts co-acting with the brackets to drive said I-beam lengthwise of the recesses, the I-beam being removable through said open ends to uncouple said sections.

WALLACE W. SMITH.

REFERENCES CITED

The following references are of record in the file of this patent:

UNITED STATES PATENTS

| Number | Name | Date |
| --- | --- | --- |
| 820,974 | Hilpert | May 22, 1906 |
| 1,964,203 | Isherwood et al. | June 26, 1934 |
| 2,379,904 | Harris | July 10, 1945 |

FOREIGN PATENTS

| Number | Country | Date |
| --- | --- | --- |
| 625 | Great Britain | Jan. 8, 1913 |
| 2,200 | Great Britain | Feb. 15, 1886 |
| 654,485 | Germany | Dec. 20, 1937 |